US011438280B2

(12) United States Patent
Parab et al.

(10) Patent No.: US 11,438,280 B2
(45) Date of Patent: Sep. 6, 2022

(54) HANDLING IP NETWORK ADDRESSES IN A VIRTUALIZATION SYSTEM

(71) Applicant: Nutanix, Inc., San Jose, CA (US)

(72) Inventors: Nitin Parab, Palo Alto, CA (US); Aaron Dean Brown, Sunnyvale, CA (US); Anupama Ashok Lolage, Santa Clara, CA (US); Binny Sher Gill, San Jose, CA (US); Blinston Savio Fernandes, Chinchinim (IN)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/778,725

(22) Filed: Jan. 31, 2020

(65) Prior Publication Data

US 2021/0067484 A1 Mar. 4, 2021

Related U.S. Application Data

(60) Provisional application No. 62/939,567, filed on Nov. 22, 2019, provisional application No. 62/894,675, (Continued)

(51) Int. Cl.
*H04L 67/10* (2022.01)
*H04L 49/00* (2022.01)
(Continued)

(52) U.S. Cl.
CPC ...... *H04L 49/3009* (2013.01); *G06F 9/45558* (2013.01); *H04L 61/103* (2013.01); (Continued)

(58) Field of Classification Search
CPC ............. H04L 61/2007; H04L 61/6022; H04L 12/4641; H04L 61/2061; H04L 67/10; G06F 2009/45595; G06F 9/45558
See application file for complete search history.

(56) References Cited

U.S. PATENT DOCUMENTS 6,590,861 B1 7/2003 Vepa et al.
8,549,518 B1 10/2013 Aron et al.
(Continued)

FOREIGN PATENT DOCUMENTS

CN 102307246 B 12/2015
CN 109067931 A 12/2018

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
(Continued)

*Primary Examiner* — Ryan J Jakovac
(74) *Attorney, Agent, or Firm* — Vista IP Law Group, LLP

(57) ABSTRACT

Methods, systems and non-transitory computer readable media for handling IP network addresses in a virtualization system. Embodiments are configured to receive, from a cloud provider, a cloud provider media access control address to assign to a network interface of a computing node. Also received from the cloud provider is a cloud provider's IP address associated with the cloud provider's media access control address. A virtual machine on the computing node is configured such that the cloud provider's IP address serves as an IP address of the virtual machine and such that a virtualization system media access control address serves as a MAC address of the virtual machine. The virtualization system correlates the cloud provider's media access control address to the IP address of the virtual machine. In some cases, the cloud provider's media access control address stored in a virtual switch of a hypervisor.

24 Claims, 12 Drawing Sheets

Related U.S. Application Data filed on Aug. 30, 2019, provisional application No. 62/939,569, filed on Nov. 22, 2019, provisional application No. 62/894,734, filed on Aug. 31, 2019.

(51) Int. Cl.
| | |
|---|---|
| H04L 61/2596 | (2022.01) |
| H04L 61/255 | (2022.01) |
| H04L 61/2592 | (2022.01) |
| G06F 9/455 | (2018.01) |
| H04L 61/103 | (2022.01) |
| H04L 61/50 | (2022.01) |
| H04L 61/5007 | (2022.01) |
| H04L 61/5061 | (2022.01) |
| H04L 12/46 | (2006.01) |
| H04L 101/622 | (2022.01) |

(52) U.S. Cl.
CPC ........ *H04L 61/255* (2013.01); *H04L 61/2592* (2013.01); *H04L 61/2596* (2013.01); *H04L 61/50* (2022.05); *H04L 61/5007* (2022.05); *H04L 61/5061* (2022.05); *H04L 67/10* (2013.01); *G06F 2009/4557* (2013.01); *G06F 2009/45595* (2013.01); *H04L 12/4633* (2013.01); *H04L 12/4641* (2013.01); *H04L 2101/622* (2022.05)

(56) References Cited

U.S. PATENT DOCUMENTS

| | | | |
|---|---|---|---|
| 8,601,473 | B1 | 12/2013 | Aron et al. |
| 8,850,130 | B1 | 9/2014 | Aron et al. |
| 9,081,603 | B2 | 7/2015 | Zhang et al. |
| 9,110,703 | B2 | 8/2015 | Santos et al. |
| 9,515,930 | B2 | 12/2016 | Devireddy et al. |
| 9,634,948 | B2* | 4/2017 | Brown ............... H04L 63/0245 |
| 9,692,696 | B2 | 6/2017 | Decusatis et al. |
| 9,772,866 | B1 | 9/2017 | Aron et al. |
| 9,825,905 | B2* | 11/2017 | Thakkar ............. H04L 61/2061 |
| 10,333,827 | B2 | 6/2019 | Xu et al. |
| 2012/0079143 | A1 | 3/2012 | Krishnamurthi et al. |
| 2013/0308641 | A1* | 11/2013 | Ackley ................ H04L 61/103 370/392 |
| 2014/0157269 | A1 | 6/2014 | Dow et al. |
| 2014/0241353 | A1 | 8/2014 | Zhang et al. |
| 2015/0117256 | A1 | 4/2015 | Sabaa et al. |
| 2015/0128245 | A1 | 5/2015 | Brown et al. |
| 2015/0180824 | A1 | 6/2015 | Atanasov |
| 2016/0105393 | A1 | 4/2016 | Thakkar et al. |
| 2016/0323245 | A1 | 11/2016 | Shieh et al. |
| 2016/0337236 | A1 | 11/2016 | Hsu et al. |
| 2016/0373405 | A1 | 12/2016 | Miller et al. |
| 2017/0295130 | A1 | 10/2017 | Mahajan et al. |
| 2018/0309718 | A1 | 10/2018 | Zuo |
| 2019/0036868 | A1 | 1/2019 | Chandrashekhar et al. |
| 2019/0260685 | A1 | 8/2019 | Tsirkin |
| 2020/0076689 | A1 | 3/2020 | Chandrashekar |
| 2020/0329047 | A1 | 10/2020 | Powers et al. |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org, first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Cano, I. et al., "Curator: Self-Managing Storage for Enterprise Clusters", 14th USENIX Symposium on Networked Systems Design and Implementation, NSDI '17, (Mar. 27, 2017).
Mellor, C., "Nutanix ushers its software onto AWS", Blocks & Files, (May 2019).
Gill, B. et al., "Technical Preview: Nutanix on AWS: Making Lift and Shift Invisible", NEXTConference, (May 2019).
Devarapalli, S. et al., "Xi Clusters: Accerate Your Hybrid Cloud Journey with Nutanix in Public Clouds", NEXTConference, Oct. 2019).
"Configuring alias IP ranges", Google Cloud, (Last updated Jun. 22, 2020).
"Adding secondary IP addresses", Skytap, (Oct. 4, 2017), date retrieved from google.
Apache, "Managing Networks and Traffic", CloudStack Administration Documentation v4.8, (Feb. 17, 2016), date retrieved from google.
Desmouceaux, Y et al., "Zero-Loss Virtual Machine Migration with IPv6 Segment Routing", 1st Workshop on Segment Routing and Service Function Chaining (SR+SFC 2018), (Nov. 2018).
Le, F. et al., "Experiences Implementing Live VM Migration over the WAN with MultiPath TCP", (Apr. 29-May 2, 2019).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
European Search Report dated Jan. 25, 2021 for related EP Application No. 20193500.4.
Non-Final Office Action dated Aug. 16, 2021 for related U.S. Appl. No. 17/086,376.
Non-Final Office Action dated Aug. 27, 2021 for related U.S. Appl. No. 16/778,754.
Rouse, M. et al. "VLAN (virtual LAN)", WhatIs.com, (Updated on Aug. 2019).
Conole et al., "Open vSwitch Documentation: Release 2.6.0", Open vSwitch Developers, (Jan. 7, 2017).
Non-Final Office Action dated Sep. 20, 2021 for related U.S. Appl. No. 17/086,388.
Final Office Action dated Apr. 5, 2022 for U.S. Appl. No. 16/778,754.
Notice of Allowance for U.S. Appl. No. 17/086,376 dated Apr. 18, 2022.
Final Office Action for U.S. Appl. No. 17/086,388 dated May 10, 2022.

\* cited by examiner

2A00

MAC Address Translation Table $210_1$

| Virtual Machine Identifier | Cloud Provider's IP Address | Virtualization System MAC Address | Cloud Provider's MAC Address | |
|---|---|---|---|---|
| VM1 | IP1 | PM1 | SM1 | } Node1 |
| VM2 | IP2 | PM2 | SM2 | } Node2 |
| VM3 | IP3 | PM3 | SM3 | } Node3 |
| ⋮ | ⋮ | ⋮ | ⋮ | |

MAC Address Translation Table $210_2$

| Virtual Machine Identifier | Cloud Provider's IP Address | Virtualization System MAC Address | Cloud Provider's MAC Address | | |
|---|---|---|---|---|---|
| VM1 | IP1 | PM1 | SM1 | } vNIC1 | } Node1 |
| VM2 | IP2 | PM2 | SM2 | } vNIC2 | } Node2 |
| VM3 | IP3 | PM3 | SM3 | } vNIC3 | } Node3 |
| VM4 | IP4 | PM4 | SM3 | } vNIC3 | |
| ⋮ | ⋮ | ⋮ | ⋮ | | |

Routing Table 112

| Cloud Provider's IP Address | Cloud Provider's MAC Address |
|---|---|
| IP1 | SM1 |
| IP2 | SM2 |
| IP3 | SM3 |
| IP4 | SM3 |
| ⋮ | ⋮ |

FIG. 2B

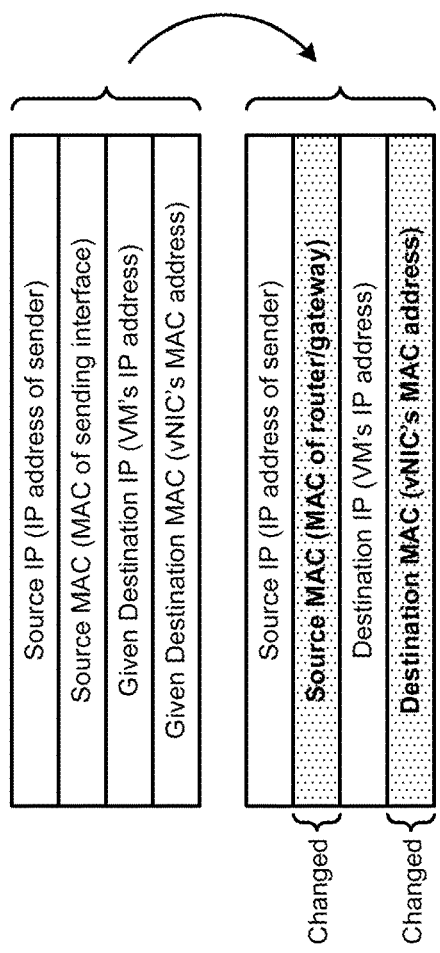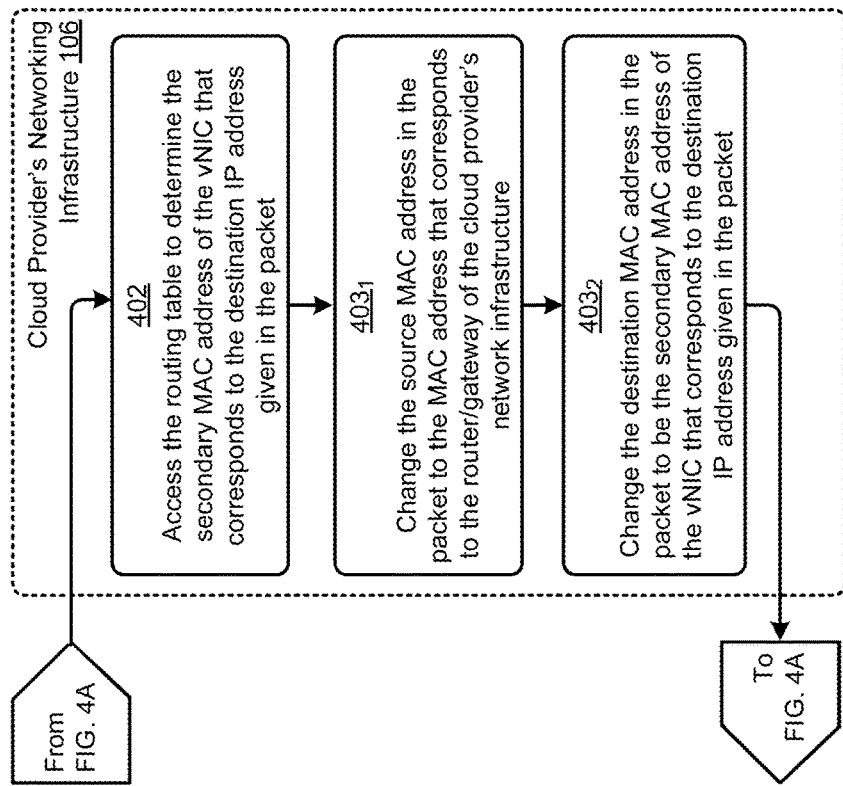
FIG. 4B

HANDLING IP NETWORK ADDRESSES IN A VIRTUALIZATION SYSTEM

RELATED APPLICATIONS

The present application claims the benefit of priority to U.S. Provisional Patent Application Ser. No. 62/939,567 titled "HANDLING IP NETWORK ADDRESSES IN A VIRTUALIZATION SYSTEM", filed Nov. 22, 2019; and the present application claims the benefit of priority to U.S. Provisional Patent Application Ser. No. 62/894,675 titled "PREASSIGNING SECONDARY IP ADDRESSES TO VIRTUAL MACHINES", filed Aug. 30, 2019; and the present application claims the benefit of priority to U.S. Provisional Patent Application Ser. No. 62/939,569 titled "VIRTUAL MACHINE MIGRATION", filed on Nov. 22, 2019; and the present application claims the benefit of priority to U.S. Provisional Patent Application Ser. No. 62/894,734 titled "VIRTUAL FORWARDING SERVICES", filed Aug. 31, 2019; and the present application is related to co-pending U.S. patent application Ser. No. 16/778,754 titled "VIRTUAL MACHINE MIGRATION IN CLOUD INFRASTRUCTURE NETWORKS", filed on even date herewith, all of which are hereby incorporated by reference in their entirety.

FIELD

This disclosure relates to cloud computing, and more particularly to techniques for handling IP network addresses in a virtualization system.

BACKGROUND

Cloud computing has evolved to the point where any number of "tenants" can flexibly avail themselves of the resources of the cloud. For example, an enterprise might host a large number of "virtual desktop machines" (e.g., Microsoft Office applications) on the cloud infrastructure. As another example, a scientist might "rent" certain specialized equipment (e.g., high-performance floating-point processors) in order to quickly conclude specialized computing tasks. As yet another example, an enterprise might want to host custom software on the "bare metal" computing nodes of the cloud computing infrastructure.

In this latter case, there is a class of software known as virtualization software that exploits the advantages of virtualized entities (e.g., virtual machines, virtual disk storage, virtual network interfaces, etc.). In most cases, when deploying virtualization software onto bare metal computing nodes, the virtualization software completely takes over the software configuration of a bare metal computing node (e.g., for number crunching and other computing tasks), yet relies on other portions of the cloud provider's infrastructure for other services (e.g., Internet access, networking, storage, etc.). For example, a virtual machine that is running a database application in a virtualization environment might need to access the Internet. In such a case, the virtualization software might need to access the real networking infrastructure of the cloud provider to perform network communications.

Unfortunately, there are no mechanisms in place for components of the virtualized environment to be able to access the full range of cloud-provided infrastructure and its corresponding range of features. Therefore, there is a need for certain services on top of the cloud-provided infrastructure to be able to take advantage of such features.

SUMMARY

The present disclosure describes techniques used in systems, methods, and in computer program products for handling IP network addresses in a virtualization system, which techniques advance the relevant technologies to address technological issues with legacy approaches. More specifically, the present disclosure describes techniques used in systems, methods, and in computer program products for correlating cloud provider networking addresses to network-accessible entities in a virtualization system. Certain embodiments are directed to technological solutions for maintaining cloud provider networking addresses that correlate to virtual machine networking addresses in a virtualization system.

The disclosed embodiments modify and improve over legacy approaches. In particular, the herein-disclosed techniques provide technical solutions that address the technical problems attendant to the fact that the number of cloud-provided networking addresses are far fewer than the number needed by virtual machines in a virtualization system. Such technical solutions involve specific implementations (i.e., data organization, data communication paths, module-to-module interrelationships, etc.) that relate to the hardware and software arts for improving computer functionality.

Many of the herein-disclosed embodiments for maintaining cloud provider networking addresses that correlate to virtual machine networking addresses in a virtualization system are technological solutions pertaining to technological problems that arise in the hardware and software arts that underlie cloud computing. Aspects of the present disclosure achieve performance and other improvements in peripheral technical fields including, but not limited to, hyperconverged computing platform networking and hyperconverged computing platform management.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 2A presents MAC address translation table models that are used to correlate cloud provider networking addresses to network-accessible entities in a virtualization system, according to some embodiments.

FIG. 2B presents a routing table model that is used to route traffic to network-accessible entities in a virtualization system, according to an embodiment.

FIG. 4A and FIG. 4B illustrate an example context for virtualized computing node operations over inbound network packets as used in systems that correlate cloud provider networking addresses to network-accessible entities in a virtualization system, according to an embodiment.

DETAILED DESCRIPTION

Figure 1:
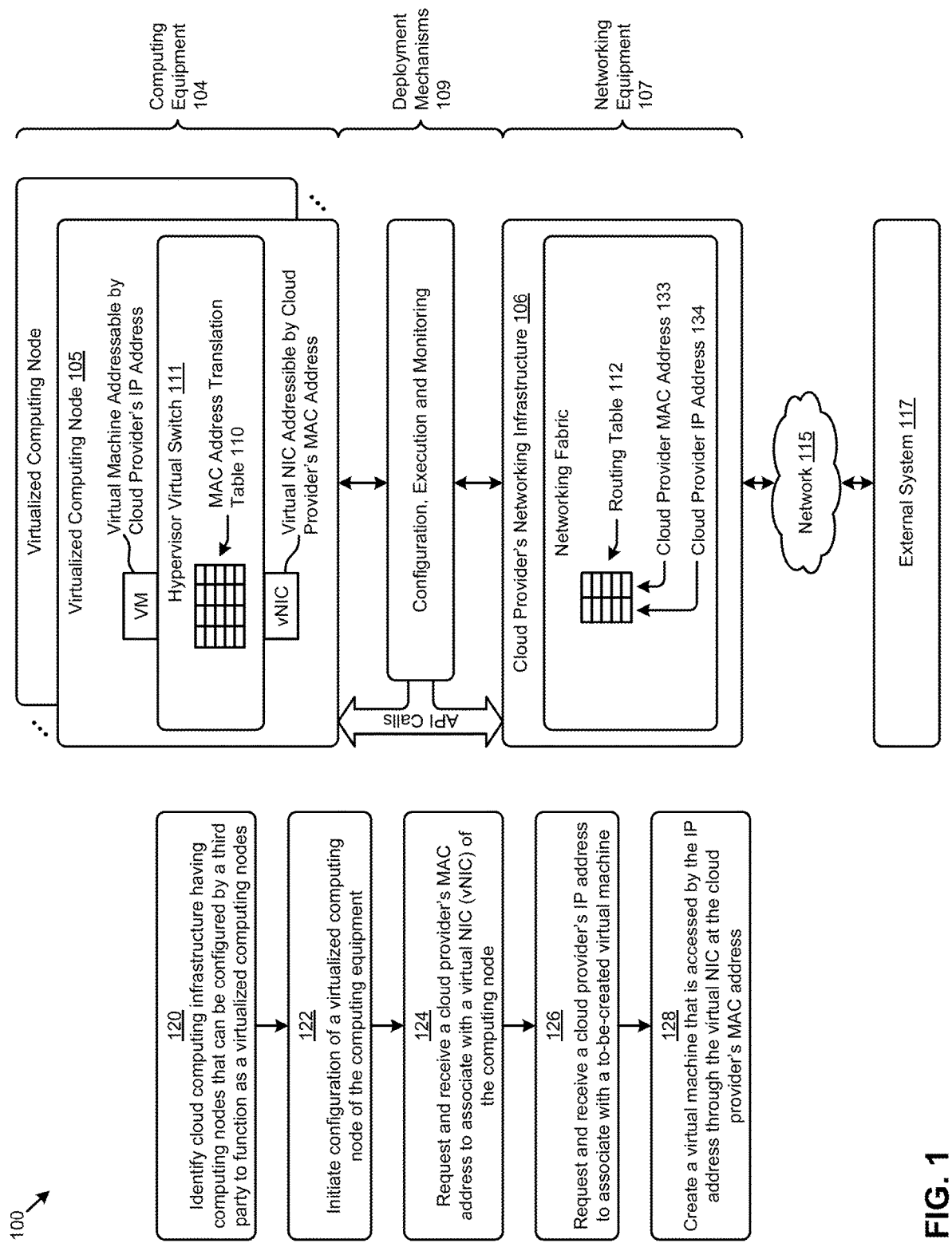
FIG. 1 exemplifies an environment in which embodiments of the present disclosure can operate.

Aspects of the present disclosure solve problems associated with using computer systems in which the number of cloud-provided networking addresses are far fewer than the number needed by virtual machines in a virtualization system. Some embodiments are directed to approaches for maintaining cloud provider networking addresses that correlate to virtual machine networking addresses in a virtualization system. The accompanying figures and discussions herein present example environments, systems, methods, and computer program products that correlate cloud provider networking addresses to network-accessible entities in a virtualization system.

Overview

When deploying a virtualization system onto a "bare metal" computing node of a cloud provider, a wide range of the cloud provider's services are needed to "instantiate" the virtualization system. Fortunately, cloud computing providers publish application programming interfaces (APIs) that facilitate deployment of a virtualization system onto a "bare metal" computing node. For example, a cloud provider might publish an API that, when called, retrieves an "instance" (i.e., a runnable set of computer instructions) and loads the instance onto an available computing node. As another example, a cloud provider might publish an API that, when called, initiates execution of the instance that was just loaded onto the available computing node. As yet another example, a cloud provider might publish an API that packages local results from execution of the instance and store the results in a network-accessible location. The deployer can then access the network-accessible location to see the results.

In some cases, such as are discussed herein, an "instance" might be an entire virtualization environment, complete with a full complement of virtualization components such as virtual machine computing capabilities, virtual networking capabilities, a hypervisor that virtualizes many or all aspects of an operating system, virtual memory, virtual I/O (input/output or IO) devices, and so on. In some cases, a virtualization system might be self-contained in a manner such that all computing features needed (e.g., computer MIPS, local storage, etc.) to accomplish a particular computing task are supplied by the bare metal computing node. However, in many cases, a particular virtualization system might need networking features beyond those supplied by the bare metal computing node so as to access resources outside of the bare metal node. In such cases, the virtualization system needs to access the cloud provider's networking infrastructure.

Unfortunately, there are many scenarios where the features corresponding the cloud-provided networking infrastructure are insufficient. As one example, the cloud-provided networking infrastructure might include a limited set of networking access points (e.g., IP addresses), whereas the virtualization environment might need to define a larger, possibly much larger set of (virtual) networking access points (e.g., a large number of virtual machines). This raises the need for the virtualization system to manage network communications to and from the cloud-provided networking infrastructure. To illustrate, a virtualization system might create many hundreds or thousands of virtual machines (VMs), each of which individual virtual machines are to be accessed via a correspondingly large set of VM-specific internet protocol (IP) address and media address control (MAC) addresses, yet the cloud-provided networking infrastructure might only have a much smaller set of MAC addresses available. This sets up a one-to-many situation where a single MAC address provided by the cloud provider needs to be mapped to many networking addresses corresponding to many VMs.

Techniques that address this one-to-many mappings are shown and described as pertain to the figures.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies an environment 100 in which embodiments of the present disclosure can operate. As an option, one or more variations of environment 100 or one or more variations of the shown steps may be implemented in the context of the architecture and functionality of the embodiments described herein.

FIG. 1 illustrates a context and steps that pertain to maintaining cloud provider networking addresses that correlate to virtual machine networking addresses in a virtualization system. Specifically, the figure is being presented to illustrate the juxtaposition of a deployment stack as well as to illustrate one example set of steps to initially configure a virtualization environment (e.g., configured from Nutanix's virtualization system components) on top of networking equipment made available by a cloud computing provider (e.g., Amazon).

The embodiment shown in FIG. 1 is merely one example. As shown, the environment comprises computing equipment 104 that are situated atop cloud-provided networking equipment 107. Various deployment mechanisms 109 are depicted. Such mechanisms include techniques for configuration, execution and monitoring. More specifically, such mechanisms include techniques for initial configuration of a virtualized computing node 105 onto the computing equipment 104, techniques for invoking runnable computing entities in a virtualization environment, and techniques for monitoring the execution. As used herein, a virtualized computing node 105 is an instruction processor (e.g., CPU) onto which software comprising a virtualization system (e.g., a host operating system and a hypervisor) is installed. As such, a virtualized computing node 105 can be formed by loading virtualization software onto unconfigured (e.g., "bare metal") computing equipment.

As shown API calls can be used to communicate between the virtualized computing node 105 and the cloud provider's networking infrastructure 106. More specifically, the API calls can be used to initialize and maintain a routing table 112 that is situated within the networking fabric of the cloud provider's networking infrastructure. Further the API calls can be used to request and retrieve network addresses that derive from the cloud provider's networking infrastructure. In some situations, a single API call is used to request a single IP address or MAC address. In other situations, a single API call is used to request a group (e.g., pool) of IP addresses that correspond to a particular MAC address of the cloud provider's networking infrastructure. These addresses are used by a hypervisor virtual switch 111 to perform inbound and outbound network traffic routing. As an example, hypervisor virtual switch 111 can route traffic to a virtual machine that is addressable at a IP address allocated by a cloud provider.

As shown, the cloud provider's networking infrastructure 106 maintains a routing table that includes a correspondence between a particular MAC address and a particular IP address. In many cases the routing table includes a correspondence between a particular single MAC address and multiple IP addresses in a one-to-many correspondence. This one-to-many correspondence allows a single networking interface to serve many virtual machines. As such, the virtualized system that is installed onto computing equipment 104 to instantiate virtualized computing node 105 can freely create a large number of virtual machines, each of which are associated with a single virtual network interface (vNIC).

An example of a configuration of such a virtualized system that has been installed onto computing equipment 104 is given in the context and flow of step 120, step 122, step 124, step 126 and step 128. Specifically, the aforementioned flow operates within a context of the shown cloud computing infrastructure that provides computing nodes (e.g., bare metal nodes) that can be configured by a third party (step 120).

In the example of FIG. 1, the computing node or nodes are configured to function as virtualized computing nodes. Operation of one or more of the shown operations serve to initialize or "bring-up" a node, even if the node initially has no software other than its basic input/output subsystem (BIOS). As a pertinent bring-up example, step 122 loads virtualization system code, including a host operating system, one or more guest operating systems, a hypervisor, and a library of virtualized components, any or all of which are configured to operate on the particular hardware that comprises the subject node. Certain components of the virtualization system (e.g., the hypervisor, monitoring agents, etc.) are "booted-up". Next, in order to initialize a virtual NIC, at step 124, an API is called to request and receive a cloud provider's MAC address 133. The operation of the API causes this MAC address to be recorded in one or more routing tables of the networking fabric. Strictly as one example, routing table 112 is shown as having multiple rows and multiple columns, where a particular row and column can store a cloud provider's MAC address.

This cloud provider's MAC address 133 is also stored in the hypervisor virtual switch 111. In the example shown the cloud provider's MAC address 133 is stored as an entry in the MAC address translation table 110 (MAT). Further in the example shown, the cloud provider's MAC address 133 is used to initialize the vNIC of the virtualized computing node 105. As such, traffic that is destined for the vNIC of the virtualized computing node can be directed through the cloud provider's networking infrastructure (e.g., using layer 2 switching).

Although the foregoing provides a layer 2 switching technique, packets include an IP address as well, which IP address is associated in a one-to-one relationship with a virtual machine, and such a unique IP address is needed in order to create a virtual machine. As such, step 126 serves to request and receive IP addresses from the cloud provider, which cloud provider's IP address 134 is then associated with a to-be-created virtual machine. Step 128 then serves to create a virtual machine that is accessible at the cloud provider's IP address 134 through the virtual NIC that is addressable by the cloud provider's MAC address 133.

Since the foregoing virtual machine has a unique IP address and is accessible through the aforementioned vNIC, network traffic packets can be addressed to the virtual machine, which network traffic packets can be sent from any external system 117 through the Internet or any other network 115.

The foregoing discussion of FIG. 1 includes a description of techniques by which network traffic packets can be addressed to a particular virtual machine that is situated at a particular NIC with a particular cloud provider's MAC address. Furthermore FIG. 1 discloses a hypervisor virtual switch 111 that employs a MAC address translation table 110 that serves to route the packet to the intended virtual machine. Various examples of a MAC address translation table 110 as well as techniques that serve to route the packet to the intended virtual machine are disclosed as pertains to the following FIG. 2A.

FIG. 2A presents MAC address translation table models 2A00 that are used to correlate cloud provider networking addresses to network-accessible entities in a virtualization system. As an option, one or more variations of MAC address translation table models 2A00 or any aspect thereof may be implemented in the context of the architecture and functionality of the embodiments described herein. The MAC address translation table models 2A00 or any aspect thereof may be implemented in any environment.

FIG. 2A illustrates aspects pertaining to maintaining cloud provider networking addresses that correlate to virtual machine networking addresses in a virtualization system. The figure is being presented with respect to its contribution to routing packets to one of many virtual machines that may be accessed through a particular virtual NIC of a virtualization system.

As shown in MAC address translation table $210_1$, each row correlates to a particular virtualization system entity. In a virtualization system such as is depicted in FIG. 1, each virtual machine is assigned a virtualization system media access control address. MAC address translation table $210_1$ depicts a correspondence between (1) a virtualization system media access control address that is assigned to a virtual machine and (2) a cloud provider's MAC address. For routing a packet from a particular vNIC at which the packet has arrived, the hypervisor virtual switch 111 (referring again to FIG. 1) accesses its MAC address translation table (MAT), looks up the row that contains the IP address of the intended virtual machine, and routes the packet to the intended virtual machine using the combination of the VM's IP address and the looked-up virtualization system MAC address.

The columnar organization of MAC lookup tables such as are depicted in FIG. 2A supports the scenario where there are multiple VMs that are accessed via a common vNIC. Specifically, since the columnar organization of the MAT table includes both (1) a cloud provider's IP address that is assigned to a virtual machine, and (2) a virtualization system media access control address that is assigned to the same virtual machine, a hypervisor virtual switch can use layer 2 switching to route a direct to the intended virtual machine. In some cases, and as shown, a MAT table may contain a virtual machine identifier. Such an identifier can be conveniently used for VM-level monitoring.

In many situations, a given node will support multiple virtual machines, and each virtual machine is assigned a particular virtualization system media access control address. However, it often happens that two or more of the virtual machines at a given node will be associated with a common vNIC. As such it can happen that several rows correlate to one particular node. This is shown in the depiction of MAC address translation table $210_2$. Specifically, while there is shown a one-to-one correspondence between a node and a vNIC (e.g., Node1 corresponds to vNIC1, Node2 corresponds to vNIC2, etc.) it is also shown that Node3 hosts two VMs, each of which are accessed through vNIC3. When routing a packet from a particular vNIC at which the packet has arrived, the hypervisor virtual switch 111 (referring again to FIG. 1) accesses its MAC address translation (MAT) table, looks up the row that contains the IP address of the intended virtual machine, and routes the packet to the intended virtual machine using the combination of the VM's IP address and the looked-up virtualization system MAC address. In this scenario, the packet is routed unambiguously to the correct VM using layer 2 switching.

The foregoing discussion of FIG. 2A discloses a MAC address table organization that serves to route a packet from a particular vNIC at a particular cloud provider's MAC address to a VM served by that vNIC. A different table with a different organization is needed within the cloud provider's networking fabric such that the cloud provider's networking fabric is able to route a packet from an external system to the correct vNIC. Such a table and discussion thereof are given as pertains to the FIG. 2B.

FIG. 2B presents a routing table model 2B00 that is used to route traffic to network-accessible entities in a virtualization system. As an option, one or more variations of routing table model 2B00 or any aspect thereof may be implemented in the context of the architecture and functionality of the embodiments described herein. The routing table model 2B00 or any aspect thereof may be implemented in any environment.

FIG. 2B illustrates organization of a routing table that is used to route a packet from an external system to a vNIC of a virtualization system. As shown, the routing table 112 has two columns: (1) a cloud provider IP address and (2) a cloud provider MAC address. Referring again to the API calls as discussed as pertains to FIG. 1, a particular one or more API calls are made from the virtualization system to the cloud provider. As earlier indicated, the API calls can be used to request and retrieve one or more network addresses that derive from the cloud provider's networking infrastructure. These addresses are (1) a cloud provider IP address, which is used to uniquely address a virtual machine, and (2) a cloud provider MAC address, which is used to uniquely address a vNIC. The shown routing table makes a correspondence between the two addresses by populating them into the same row. The tabular organization is merely illustrative and other techniques can be used to maintain the correspondence between the two addresses.

It must be noted that, regardless of the particular technique to maintain a particular correspondence between the MAC address and the IP address, there is a one-to-many correspondence where a single MAC address provided by the cloud provider needs to be mapped to many networking addresses corresponding to many VMs.

The foregoing discussions of FIG. 2A and FIG. 2B broach the concepts of outbound routing (e.g., routing of packets that originate from a VM) and inbound routing (e.g., routing of packets that are intended for a VM). Specific techniques using the correspondences that are captured in the foregoing data structures are discussed in further detail in FIG. 3A, FIG. 3B, FIG. 4A, and FIG. 4B.

Figure 3A:
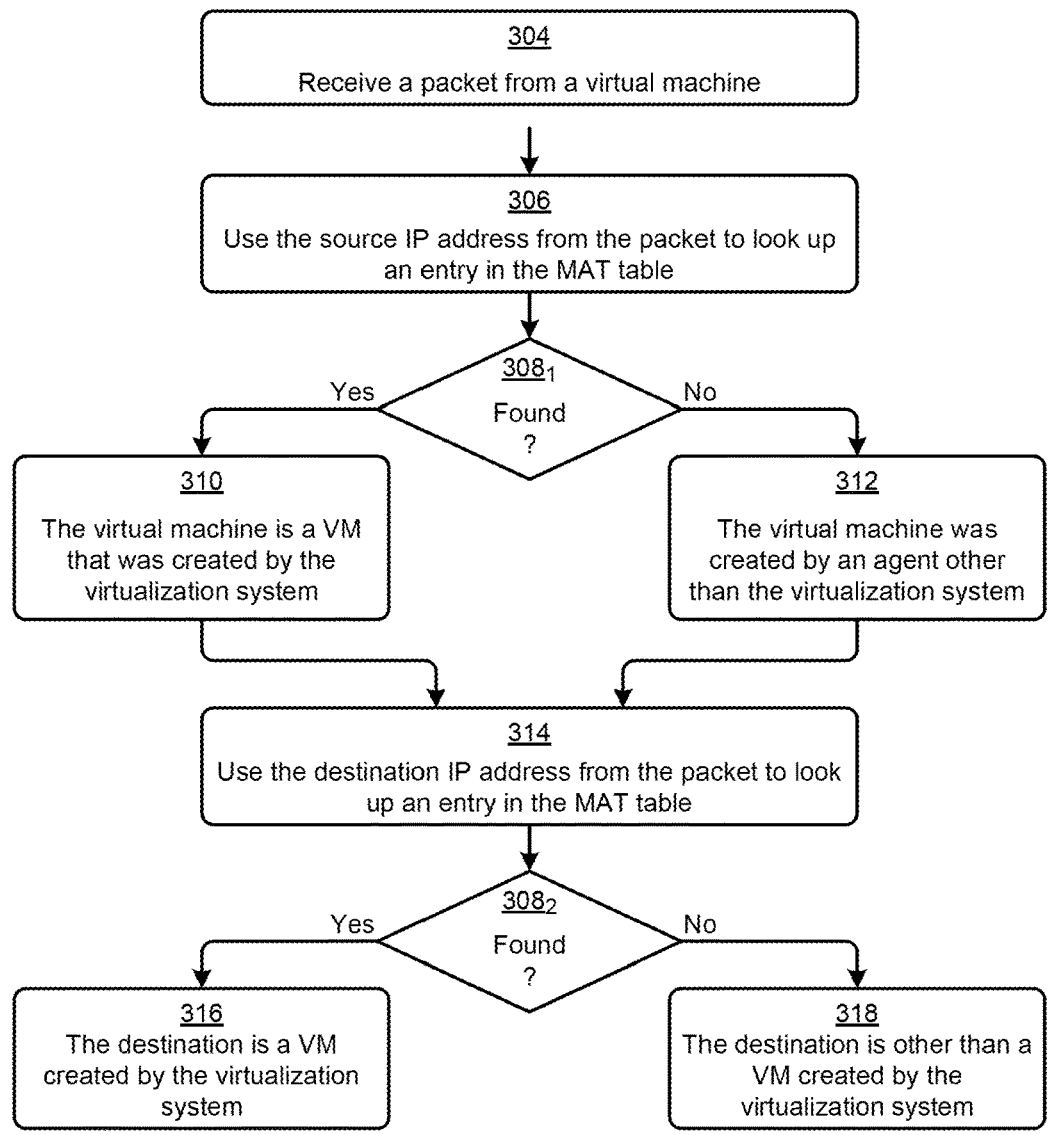
FIG. 3A is a flowchart depicting operations used in systems that correlate cloud provider networking addresses to network-accessible entities in a virtualization system, according to an embodiment.

FIG. 3A is a flowchart 3A00 depicting operations used in systems that correlate cloud provider networking addresses to network-accessible entities in a virtualization system. The figure is being presented to explain how a MAC address translation table can be used to determine whether or not a network accessible entity is a VM created by the virtualization system. This determination is needed since the MAC addresses of a VM created by the virtualization system are logical constructions that do not refer to actual hardware MAC addresses.

When a MAC address in a packet can be determined to be a MAC addresses of a VM created by the virtualization system, that MAC address can be translated to an actual hardware MAC address. More specifically, when a MAC address in a packet can be determined to be a MAC addresses of a VM created by the virtualization system, that MAC address can be translated to a cloud provider's media access control address. The depicted technique accesses a MAT table to determine whether the subject MAC address is a MAC address that was generated by the virtualization system when creating a virtual machine.

The flow is shown and discussed as pertains to outbound traffic. However, the technique can be used in any context to determine if a MAC address corresponds to a VM that was created by the virtualization system. The shown flow commences at step 304, upon receipt of a IP packet from a virtual machine. The IP packet contains a source IP address, a source MAC address, a destination IP address, and a destination MAC address. At step 306, the source IP address is used as a subject address to find a corresponding entry in the MAT table. If such an entry is found, the "Yes" branch of decision $308_1$ is taken, and the sender is thus known to be a VM that was created by the virtualization system (step 310). Otherwise, the "No" branch is taken, and the sender is known to be an entity that was not created by the virtualization system (at determination 312). Such a determination is used when substituting source MAC addresses. Specifics of source MAC address substitutions are further discussed as pertains to FIG. 3B.

There are many other ways to look up an entry in the MAT table. However, in the foregoing embodiments, even when there is a one-to-many relationship between a single MAC address (e.g., the MAC address of a vNIC) and multiple IP addresses (e.g., any number of virtual machines that are addressed through that vNIC), a lookup by IP address returns at most one MAT table entry.

Continuing this example flow, the foregoing technique to access a MAT table—to determine whether the subject MAC address is a MAC address that was generated by the virtualization system or not—can also be used with respect to destination MAC addresses. Specifically, at step 314, the destination IP address is used as a subject IP address to find a corresponding entry in the MAT table. If there is such an entry, the "Yes" branch of decision $308_2$ is taken, and the destination is thus known to be a VM that was created by the virtualization system (step 316). Otherwise, the "No" branch is taken, and the sender is known to be an entity that was not created by the virtualization system (at determination 318). Such a determination is used when substituting MAC addresses. Specifics of destination MAC address substitutions are further discussed as pertains to FIG. 3B.

Figure 3B:
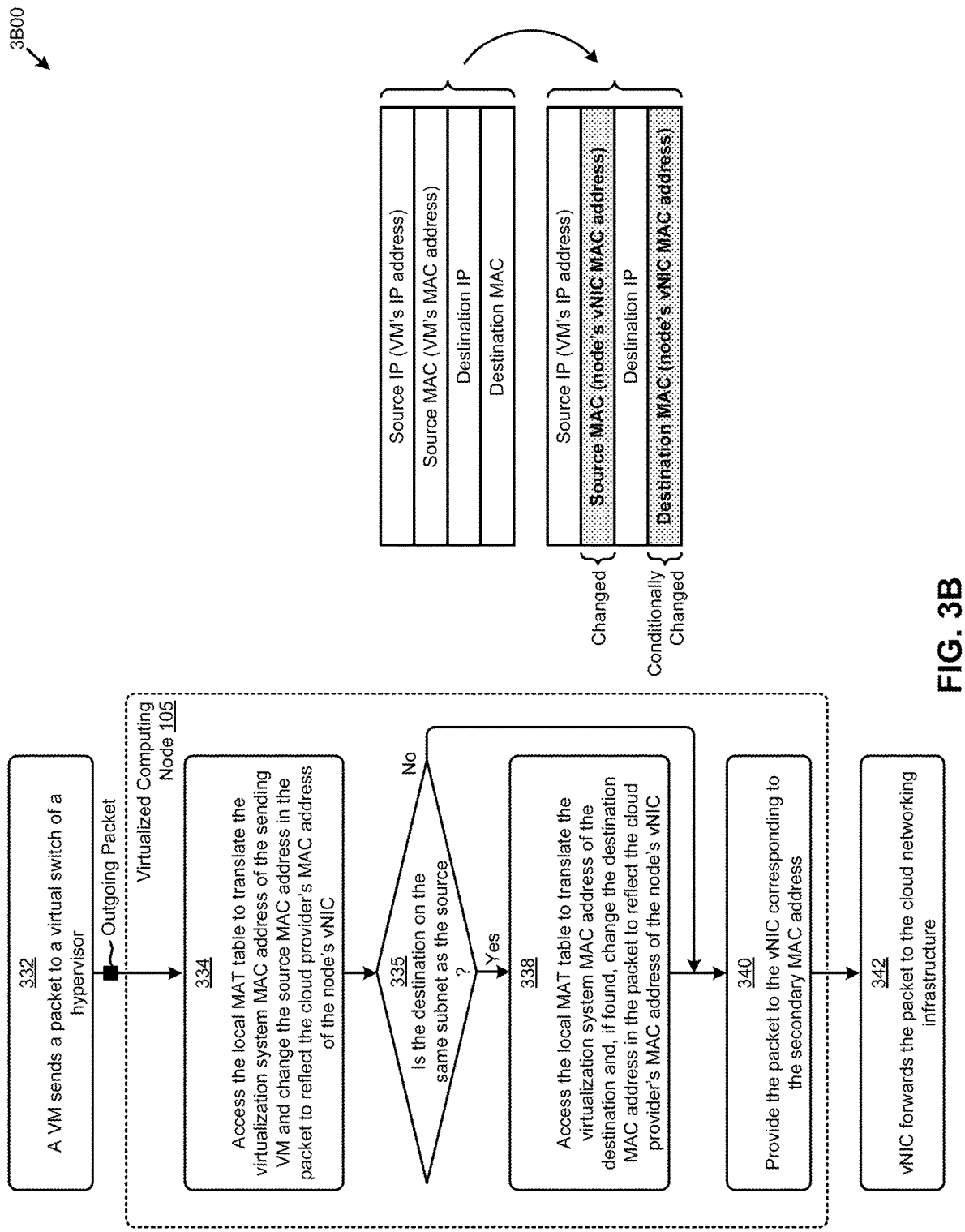
FIG. 3B illustrates example virtual switch operations performed over outbound network packets as used in systems that correlate cloud provider networking addresses to network-accessible entities in a virtualization system, according to an embodiment.

FIG. 3B illustrates example virtual switch operations 3B00 performed over outbound network packets as used in systems that correlate cloud provider networking addresses to network-accessible entities in a virtualization system. As an option, one or more variations of the virtual switch operations over outbound network packets or any aspect thereof may be implemented in the context of the architecture and functionality of the embodiments described herein. The virtual switch operations over outbound network packets or any aspect thereof may be implemented in any environment.

FIG. 3B illustrates aspects pertaining to routing of a packet that originates from a VM. Specifically, the figure and corresponding discussion show and describe how a packet is originally addressed and how it is modified by a virtual switch of a virtualized computing node.

The shown flow commences at step 332, upon the event that a virtual machine generates an outgoing packet and sends it to a virtual switch of a virtualized computing node. Such a packet includes a destination in the form of a destination IP address and a destination MAC address. The outgoing packet also includes the sender's addressing information—specifically the IP address of the sending VM and the MAC address of the sending VM—and the packet is presented to the virtual switch. The virtual switch then accesses its MAT table to translate the virtualization system MAC address into a cloud provider's MAC address. If the sending VM is a VM that was created by the virtualization system, then the sender's MAC address is translated from the VM's virtualization system MAC address (sometimes referred to herein as a "primary MAC address") to a corresponding cloud provider's MAC address (sometimes referred to herein as a "secondary MAC address"). This translation and change (step 334) is needed because the virtualization system MAC address is merely a logical construction of the virtualization system, whereas the corresponding cloud provider's MAC address is a MAC address of an actual interface to which packets can be routed from an external system.

Referring to decision 335 of FIG. 3A, if the sender and the destination are both on the same subnet, then the "Yes" branch is taken, and the destination MAC address is conditionally changed at step 338. Specifically, if the destination MAC address is found in the MAT table, then the outbound packet is modified to include the secondary vNIC address, which is a MAC address of an actual interface to which packets can be routed using the cloud provider's networking infrastructure. On the other hand, if the sender and the destination are not on the same subnet, then the "No" branch of decision 335 is taken, and the destination MAC address is not changed.

After the outgoing packet has been modified, the packet can then be provided (at step 340) by the virtual switch to the vNIC that is associated with the secondary MAC address. The vNIC in turn forwards the packet to the cloud networking infrastructure (at step 342), which in turn routes the packet onward towards its destination.

Figure 4A:
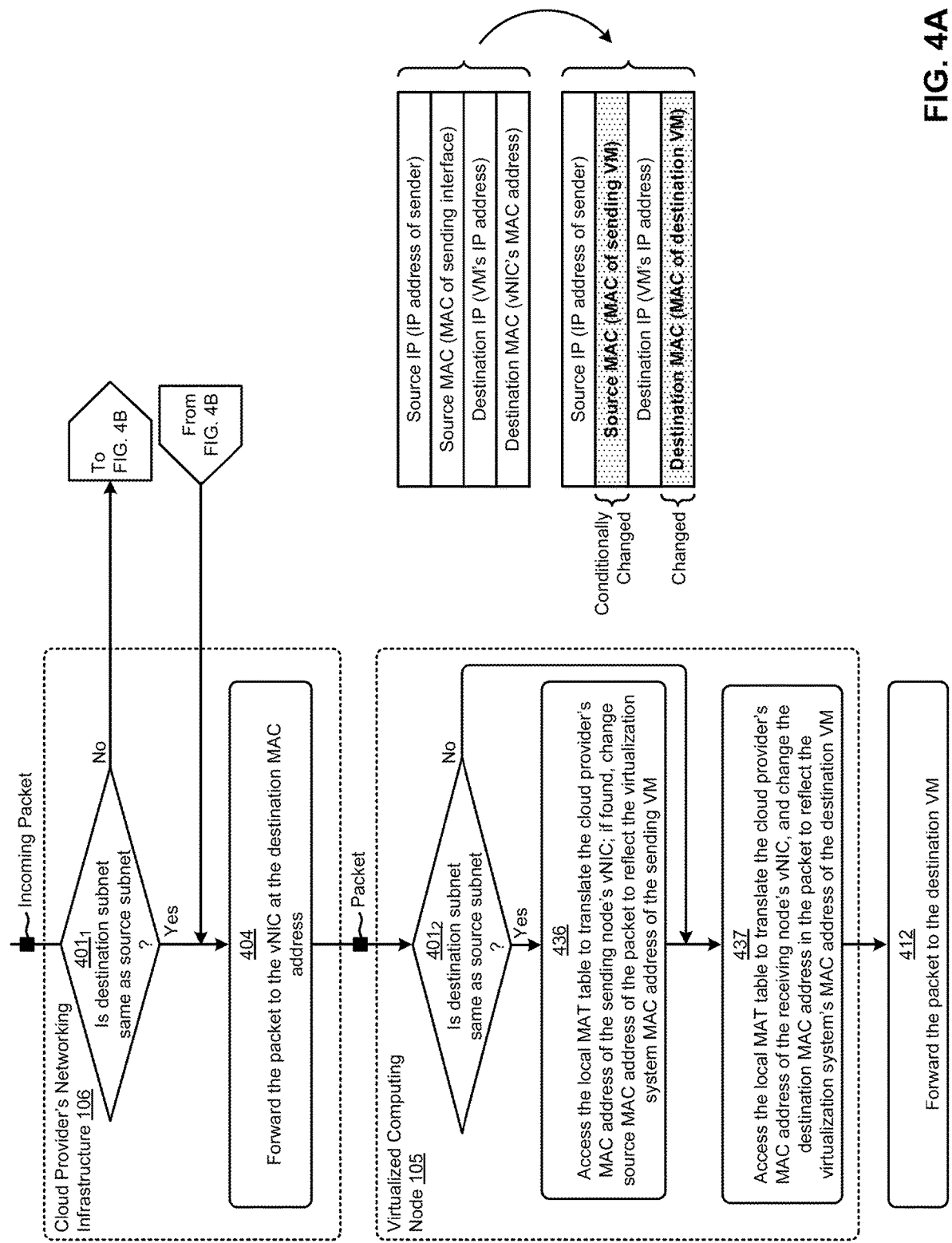

FIG. 4A illustrates an example context for virtualized computing node operations over inbound network packets as used in systems that correlate cloud provider networking addresses to network-accessible entities in a virtualization system. As an option, one or more variations of virtualized computing node operations over inbound network packets or any aspect thereof may be implemented in the context of the architecture and functionality of the embodiments described herein. The virtualized computing node operations over inbound network packets or any aspect thereof may be implemented in any environment.

The shown flow begins when the cloud provider's networking infrastructure 106 receives an incoming packet, possibly from an external system or possibly from within the cloud provider's networking infrastructure itself. Regardless of the source of the packet, the packet is received at some networking device within the cloud provider's networking infrastructure and, at that point, a test is carried out to determine if the source and destination are on the same subnet. Decision $401_1$ serves to route the flow based on the result of the test. Specifically, if the source and destination are not on the same subnet, then the "No" path is taken, and the steps of FIG. 4B are carried out. Otherwise, if the source and destination are on the same subnet, then the "Yes" path is taken, and the flow goes to step 404—without carrying out the steps of FIG. 4B.

At step 404 the packet has enough destination information in it to be routed to a vNIC that corresponds to the destination MAC address given in the packet, after which the packet is received at the virtualized computing node 105. The packet is again, in decision 401$_2$, subjected to a test to determine if the source and destination are on the same subnet. Decision 401$_2$ serves to route the flow based on the result of the test. Specifically, if the source and destination are on the same subnet, then the "Yes" path is taken, and step 436 is carried out to conditionally change the source MAC address to reflect the virtualization system MAC address of the sending VM. Otherwise, the "No" path is taken, and the flow goes to step 437, which translates the address from the cloud provider's vNIC MAC address to a virtualization system MAC address. The translated address is changed in the destination MAC address in the packet to reflect the virtualization system MAC address of the destination VM.

After making such changes to the address field(s) of the incoming packet, the modified packet now includes both the cloud provider's IP address of the VM (sometimes referred to herein as a secondary IP address or sometimes referred to herein as a preassigned IP address) as well as the virtualization system media access control address such that it can be forwarded (at step 412) to the VM.

FIG. 4B includes steps that are carried out by the cloud provider's networking infrastructure 106 so as to route traffic that might be destined for an entity of the virtualization system. As shown, at step 402, a routing table such as routing table 112 is accessed to determine the secondary MAC address of the vNIC that corresponds to the destination IP address. Using the information in the routing table, the destination vNIC can be determined. Next, the source MAC address in the packet is changed (step 403$_1$) to be the MAC address of the router/gateway of the cloud provider's networking infrastructure the determined destination vNIC. Also, the destination MAC address in the packet is changed to be the secondary MAC address of the vNIC that corresponds to the destination IP address given in the packet (step 403$_2$). The packet is then ready to be forwarded (step 404 of FIG. 4A) to the determined destination vNIC MAC address.

Figure 5A:
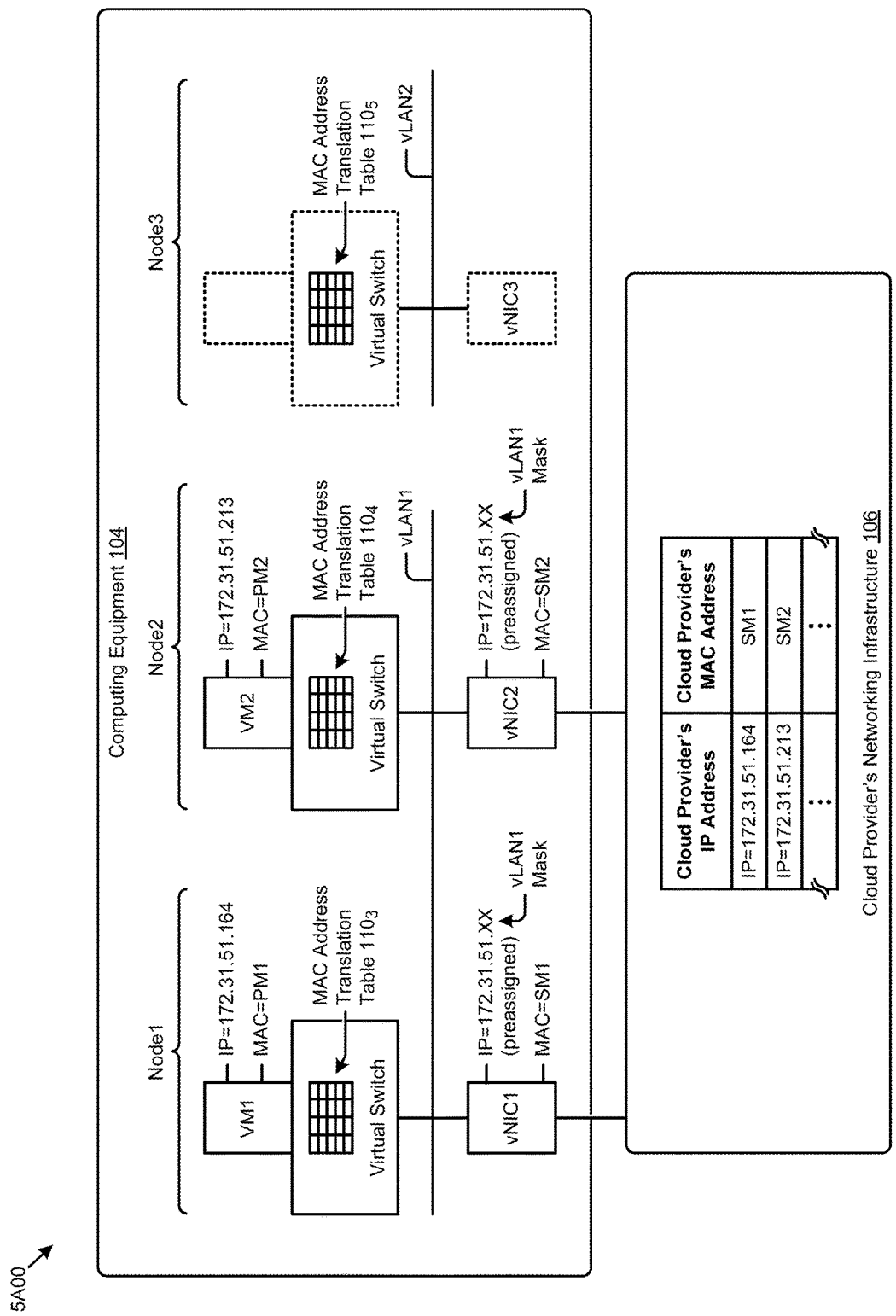
FIG. 5A illustrates an example vLAN formation technique as used in systems that correlate cloud provider networking addresses to network-accessible entities in a virtualization system, according to an embodiment.

FIG. 5A illustrates an example vLAN formation technique 5A00 as used in systems that correlate cloud provider networking addresses to network-accessible entities in a virtualization system. As an option, one or more variations of vLAN formation technique 5A00 or any aspect thereof may be implemented in the context of the architecture and functionality of the embodiments described herein. The vLAN formation technique 5A00 or any aspect thereof may be implemented in any environment.

FIG. 5A illustrates aspects pertaining to maintaining cloud provider networking addresses that correlate to virtual machine networking addresses in a virtualization system. Specifically, the figure is being presented with respect to its contribution to addressing the problem of forming and routing to virtual VLANs in a virtualization system.

As used herein a vLAN (virtual LAN) is a logical construction that groups together collections of virtual machines and other virtualized devices. VLANs are often formed to address functional and/or performance and/or security requirements of a virtualization system. VLANs can be used to provide security within a virtualization system by allowing a high degree of control over which virtualized devices have access to each other.

The example shown in FIG. 5A depicts how multiple nodes can share a particular VLAN (e.g., the shown vLAN1). The example of FIG. 5A also depicts how a second or Nth vLAN (e.g., vLAN2) can be formed.

As indicated above, a vLAN is a logical construction that groups together collections of virtual machines and other virtualized devices. FIG. 5A depicts this by showing that VM1 and VM2 are associated with vLAN1. In this illustrative example, the VM1 is access through vNIC1 and VM2 is accessed through vNIC2. Packets are routed to the correct vNIC since each vNIC is configured at a different secondary MAC address, and because each vNIC has an IP address and mask (e.g. a preassigned secondary IP address and VLAN mask). Specifically, a packet that is destined for IP address of 172.31.51.164 and MAC address of SM1 would be routed to and forwarded by vNIC1 because the IP address (after masking) and secondary MAC address both match. Similarly, a packet that is destined for IP address of 172.31.51.213 and secondary MAC address of SM2 would be routed to and forwarded by vNIC2 because the IP address (after masking) and MAC address both match.

When a packet arrives at the correct virtual node (e.g., Node1), that node's MAT table (e.g., MAC address translation table 110$_3$) is accessed and the secondary MAC address (e.g., SM1) is translated into its corresponding primary MAC address (PM1) based on the destination IP address in the packet. This process is shown and described in step 436 and step 437 of FIG. 4A. The same process is used when a packet correctly arrives at Node2. Specifically, when a packet arrives at the correct virtual node (e.g., Node2), that node's MAT table (e.g., MAC address translation table 110$_4$) is accessed and the secondary MAC address (e.g., SM2) is translated into its corresponding primary MAC address (PM2) based on the destination IP address in the packet.

Many virtualized system configurations are intended to support multiple tenants. In some cases, use of separate computing equipment and separate networking equipment serves to isolate one tenant from another tenant. However, this can lead to inefficiencies. One improved approach to isolate one tenant from another tenant is to assign a first set of virtualized computing entities (e.g., VMs) of a first tenant to interface to a first vLAN. Then, for a second tenant, assign a second set of virtualized computing entities (e.g., VMs) of a second tenant to interface to a second vLAN. As such, a virtualization system might need to create any number of vLANs to isolate the virtualized entities of a first tenant from the virtualized entities of a second tenant.

One mechanism for isolating the virtualized entities of a first tenant from the virtualized entities of a second tenant, while avoiding inefficiencies that arise from coarse equipment assignments is depicted in the example of FIG. 5A. Although the example of FIG. 5A depicts only a second vLAN (e.g., vLAN2) a large number of vLANs can be formed for network communication between any number of computing entities that are operational on the computing equipment 104. Moreover, a large number of vLANs can be supported on a single node. More specifically, a single virtual node may support multiple disjoint sets of virtual machines (e.g., belonging to, or owned by different tenants), and each disjoint set can be associated with a different vLAN.

When forming a new vLAN, the virtualization system calls an API to request a pool of multiple IP addresses that correlate to a subnet of the cloud provider's networking infrastructure. More specifically, when requesting a pool of multiple IP addresses, each IP address returned will be an IP address that correlates to the cloud provider's MAC address of the subnet.

As an example, when forming new vLAN2, a separate vLAN from vLAN1, the virtualization system will form a new a MAC address translation table (MAC address translation table $110_5$) based an API call to request a pool of multiple IP addresses that correlate to a subnet of the cloud provider's networking infrastructure. More specifically, when forming new vLAN2, each IP address of the pool will be an IP address that correlates to the cloud provider's MAC address of a subnet that is different than the subnet of vLAN1.

Use of a vLAN is merely one way to address performance and other networking issues. Another way is route through multiple networking interfaces that serve the same virtual node. This technique is shown and discussed as pertains to FIG. 5B.

Figure 5B:
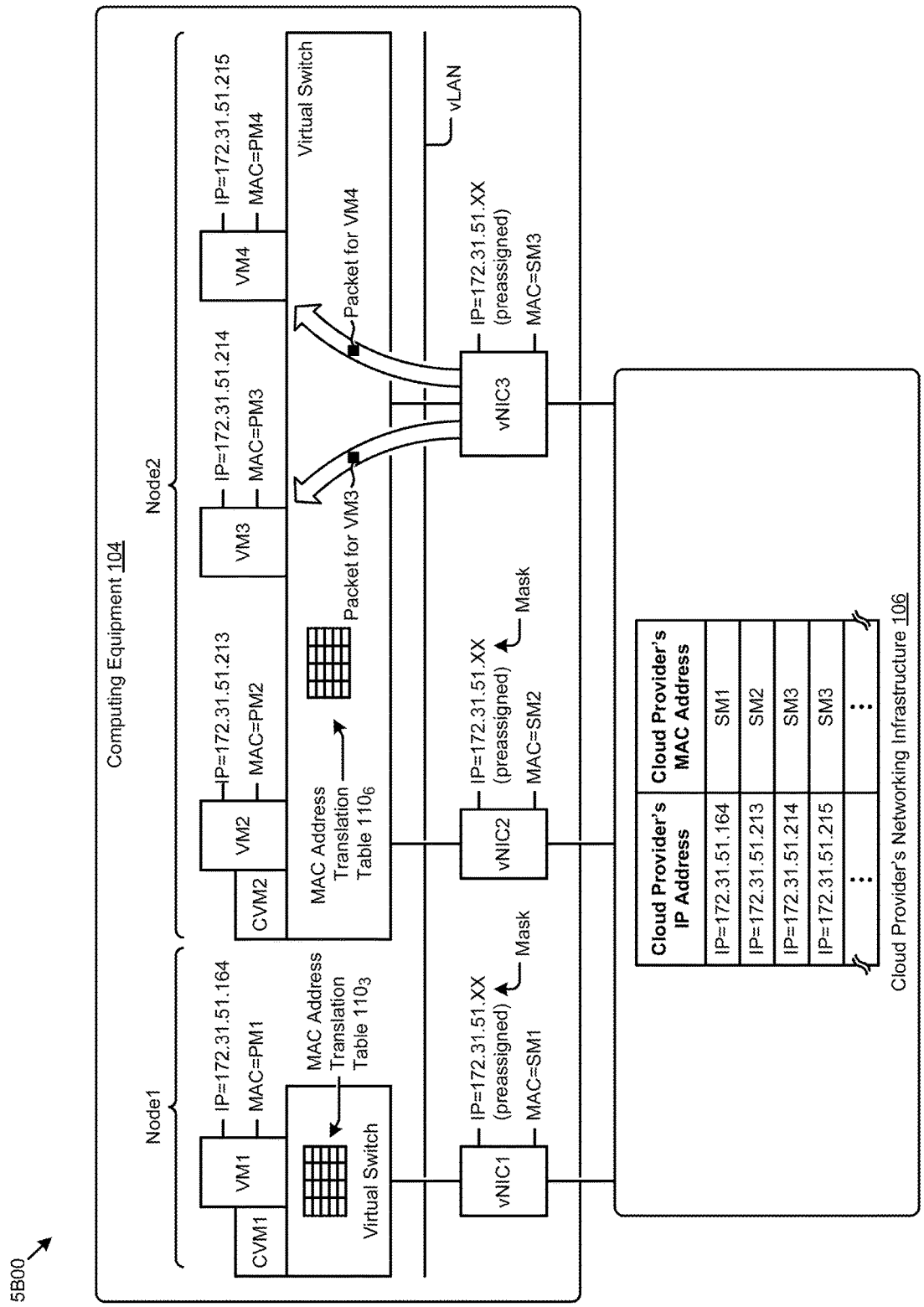
FIG. 5B illustrates a virtualization system packet routing technique as used in configurations that have two or more virtual networking interfaces operating on a single virtual node, according to an embodiment.

FIG. 5B illustrates a virtualization system packet routing technique 5B00 as used in configurations that have two or more virtual networking interfaces operating on a single virtual node. As an option, one or more variations of virtualization system packet routing technique 5B00 or any aspect thereof may be implemented in the context of the architecture and functionality of the embodiments described herein. The virtualization system packet routing technique 5B00 or any aspect thereof may be implemented in any environment.

The example configuration of FIG. 5B shows a single virtual (e.g., the shown Node2) as having two network interfaces (e.g., the shown vNIC2 and vNIC3). The example configuration also shows a pool of two IP addresses that are associated with a subnet of the cloud provider's networking infrastructure. In this example, the IP address 172.31.51.214 and the IP address 172.31.51.215 are associated with the subnet at MAC address SM3. This is shown in the routing table. Even though there are multiple virtual machines that are accessed via the same vNIC (e.g., vNIC3 at MAC address SM3), packets are routed to the correct virtual machine. Specifically, and as shown a packet destined for VM3 is routed to VM3, whereas a packet destined for VM4 is routed to VM4. This is because there is a correspondence (e.g., in MAC address translation table $110_6$) between the cloud provider's MAC address SM3 and the cloud provider's IP address IP3 as well as a correspondence between the cloud provider's MAC address SM3 and the cloud provider's IP address IP4. Furthermore, there is a correspondence (e.g., in MAC address translation table $110_6$) between a particular VM's IP address and its virtualization system MAC address. Therefore, packets can be addressed to the correct VM using the techniques as shown and described as pertains to FIG. 4A and FIG. 4B.

FIG. 5B depicts a controller virtual machine (CVM) situated at each node. Specifically, and as shown, CVM1 is situated at Node1 and CMV2 is situated at Node2. The CVM at each node is configured to handle various forms of input and output. More specifically, a CVM can support creation and ongoing management of any number of virtualized devices. As one illustrative case, a CVM can facilitate communication with virtual disk subsystem which in turn can include direct or indirect communication using any of various IO functions (e.g., NFS IO, iSCSI IO, SMB IO, etc.). Various embodiments and uses of controller virtual machines are discussed in detail as pertains to FIGS. 7A, 7B, and 7C.

Additional Embodiments of the Disclosure

Additional Practical Application Examples

Figure 6:
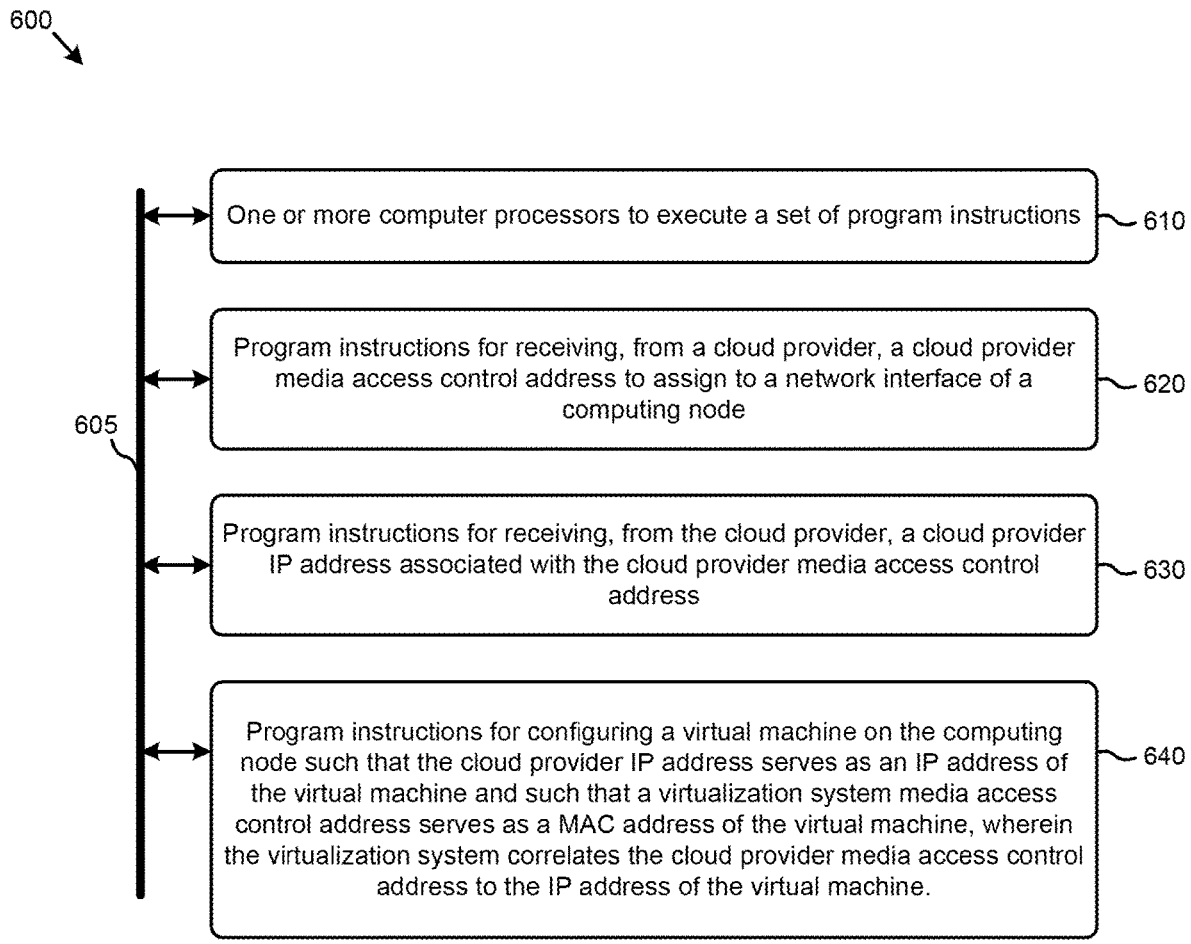
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. The partitioning of system 600 is merely illustrative and other partitions are possible.

As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: receiving, from a cloud provider, a cloud provider media access control address to assign to a network interface of a computing node (module 620); receiving, from the cloud provider, a cloud provider IP address associated with the cloud provider media access control address (module 630); and configuring a virtual machine on the computing node such that the cloud provider IP address serves as an IP address of the virtual machine and such that a virtualization system media access control address serves as a MAC address of the virtual machine, wherein the virtualization system correlates the cloud provider media access control address to the IP address of the virtual machine (module 640).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 7A:
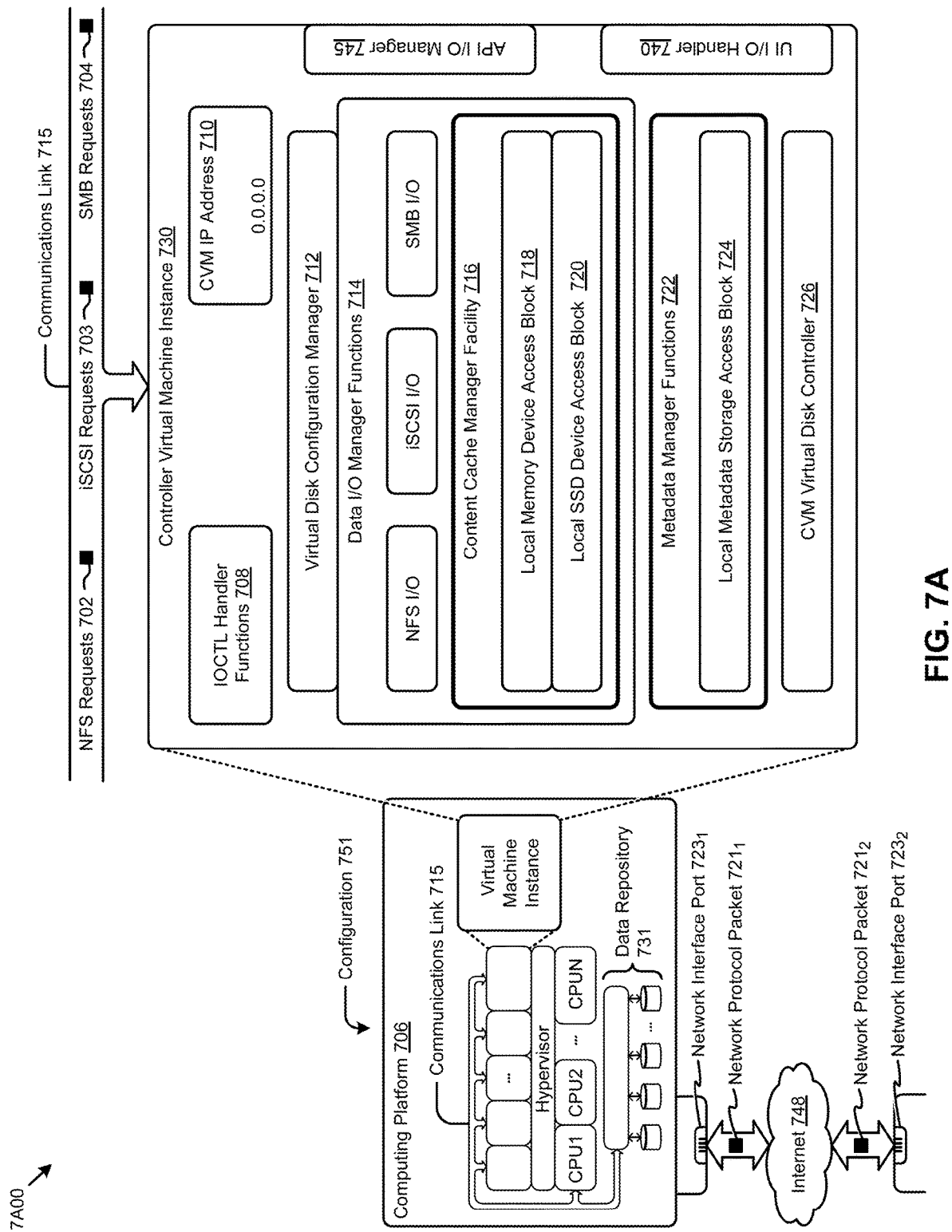
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to correlation of cloud provider networking addresses to network-accessible entities in a virtualization system. In some embodiments, a module may include one or more state machines and/or combinational logic used to implement or facilitate the operational and/or performance characteristics pertaining to correlation of cloud provider networking addresses to network-accessible entities in a virtualization system.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of correlation of cloud provider networking addresses to network-accessible entities in a virtualization system). Such files or records can be brought into and/or stored in volatile or non-volatile memory. More specifically, the occurrence and organization of the foregoing files, records, and data structures improve the way that the computer stores and retrieves data in memory, for example, to improve the way data is stored and accessed when the computer is performing operations pertaining to correlation of cloud provider networking addresses to network-accessible entities in a virtualization system, and/or for improving the way data is manipulated when performing computerized operations pertaining to maintaining cloud provider networking addresses that correlate to virtual machine networking addresses in a virtualization system.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
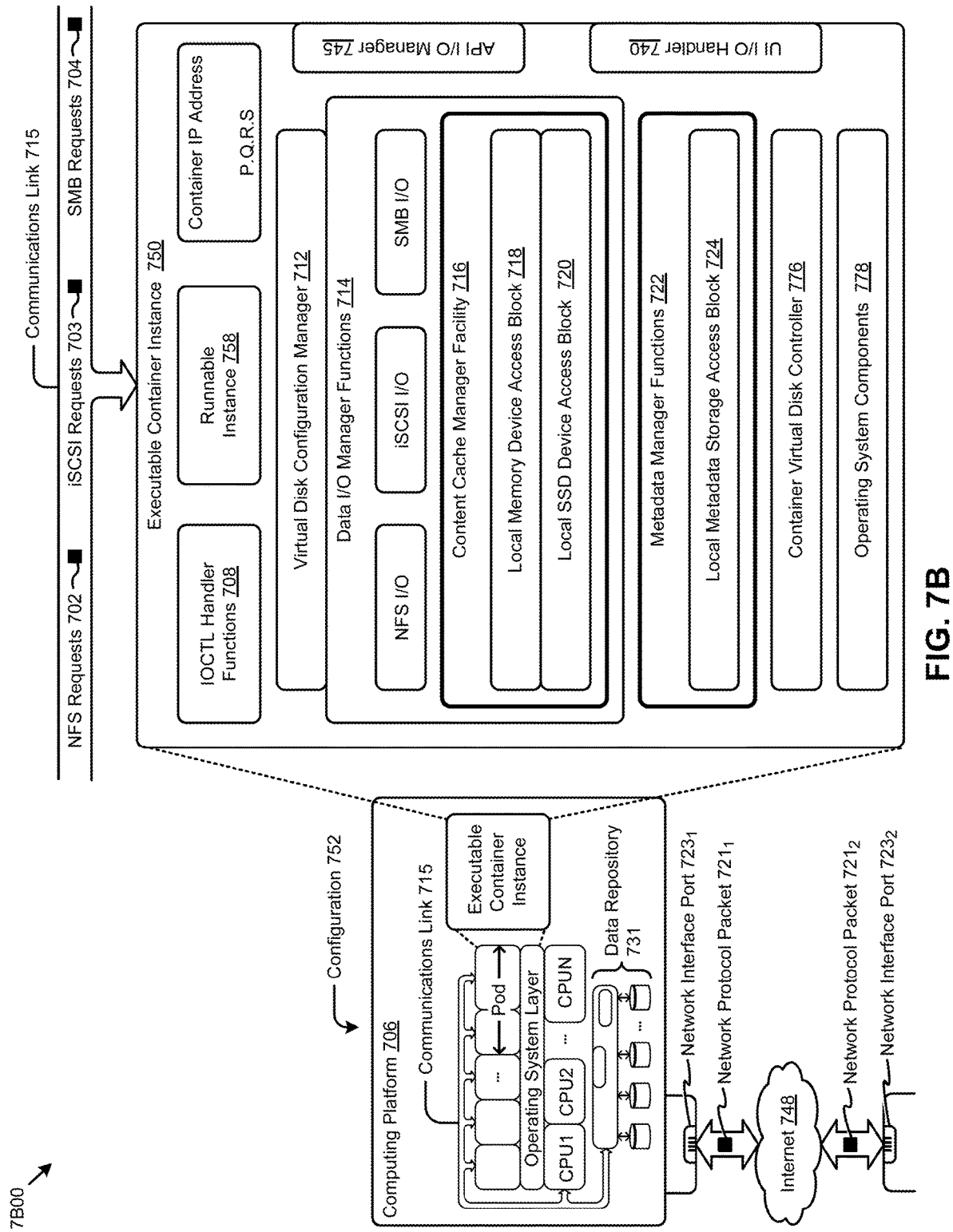

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls -a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
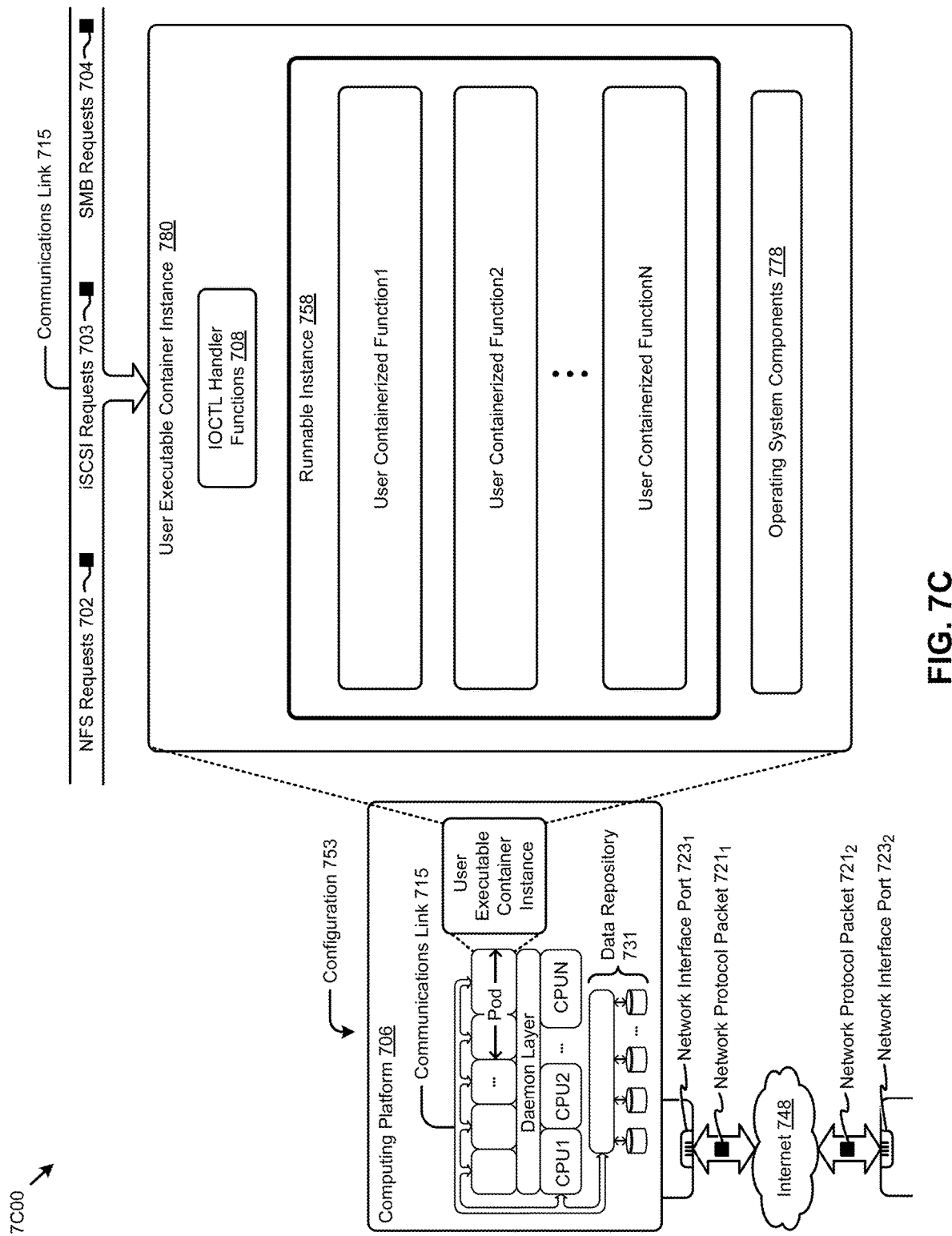

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when executed by a processor causes a set of acts comprising:
   receiving, from a cloud provider that provides computing resources to a tenant, a cloud provider media access control (MAC) address that is assigned to a network interface of a computing node of a virtualization system, wherein the computing node comprises a bare metal computing node of a plurality of bare metal computing nodes that form the virtualization system, and virtual system MAC addresses in the virtualization system are assignable by the tenant; and
   providing network communication to the computing node through the cloud provider at least by:
      configuring, by the tenant, a first virtual machine on the computing node for the network communication by assigning both the cloud provider MAC address and a first virtualization system MAC address; and
      configuring, by the tenant, a second virtual machine on the computing node for the network communication by assigning both the cloud provider MAC address and a second virtualization system MAC address,
      wherein the first and the second virtual machines share the cloud provider MAC address and are assigned to different virtualization system MAC addresses.

2. The non-transitory computer readable medium of claim 1, wherein both a first cloud provider Internet Protocol (IP) address and a second cloud provider IP address are associated with the cloud provider MAC address and the first cloud provider IP address is assigned to the first virtual machine and the second cloud provider IP address is assigned to the second virtual machine, where the first and second cloud provider IP addresses are different IP addresses.

3. The non-transitory computer readable medium of claim 2, wherein the first and second cloud provider IP addresses are received by operation of an application programming interface (API) to request a pool of IP addresses that correlates to the cloud provider MAC address.

4. The non-transitory computer readable medium of claim 1, wherein an inbound network packet received from the cloud provider comprises the cloud provider MAC address, and the computing node in the virtualization system respectively translates the cloud provider MAC address in the inbound network packet into the first virtualization system MAC address for the first virtual machine and the second virtualization system MAC address for the second virtual machine.

5. The non-transitory computer readable medium of claim 1, wherein an outbound network packet received from the first virtual machine comprises a virtualization system MAC address that is different from the cloud provider MAC address, and the virtualization system translates the virtualization system MAC address in the outbound network packet into the cloud provider MAC address before sending the outbound network packet to the cloud provider that further sends the outbound network packet to a destination.

6. The non-transitory computer readable medium of claim 2, wherein the set of acts further comprise receiving, from the cloud provider, the second cloud provider IP address that is assigned to the second virtual machine on the computing node.

7. The non-transitory computer readable medium of claim 1, wherein the set of acts further comprise maintaining a MAC address translation table that respectively correlates the cloud provider MAC address with the first virtualization system MAC address for the first virtual machine and the second virtualization system MAC address for the second virtual machine and a communication packet from the first or second virtual machines is modified prior to transmission of the communication packet from the computer node and through the cloud provider by:
changing a source mac address of the first or second virtual machine to the cloud provider MAC address and conditionally changing a destination mac address to another shared cloud provider MAC address assigned to another network interface of another computing node in the virtualization system.

8. The non-transitory computer readable medium of claim 1, wherein the set of acts further comprise configuring a virtual local area network (VLAN) to route a network packet comprising at least the cloud provider MAC address to the second virtual machine by using at least a virtualization system MAC address assigned to the second virtual machine and layer 2 switching between network interfaces of the VLAN when both the first and the second virtual machine are identified at least by the cloud provider MAC address in network traffic.

9. A method, comprising:
receiving, from a cloud provider that provides computing resources to a tenant, a cloud provider media access control (MAC) address that is assigned to a network interface of a computing node of a virtualization system, wherein the computing node comprises a bare metal computing node of a plurality of bare metal computing nodes that form the virtualization system, and virtual system MAC addresses in the virtualization system are assignable by the tenant; and
providing network communication to the computing node through the cloud provider at least by:
configuring, by the tenant, a first virtual machine on the computing node for the network communication by assigning both the cloud provider MAC address and a first virtualization system MAC address; and
configuring, by the tenant, a second virtual machine on the computing node for the network communication by assigning both the cloud provider MAC address and a second virtualization system MAC address,
wherein the first and the second virtual machines share the cloud provider MAC address and are assigned to different virtualization system MAC addresses.

10. The method of claim 9, wherein both a first cloud provider Internet Protocol (IP) address and a second cloud provider IP address are associated with the cloud provider MAC address and the first cloud provider IP address is assigned to the first virtual machine and the second cloud provider IP address is assigned to the second virtual machine, where the first and second cloud provider IP addresses are different IP addresses.

11. The method of claim 10, wherein the first and second cloud provider IP addresses are received by operation of an application programming interface (API) to request a pool of IP addresses that correlate to the cloud provider MAC address.

12. The method of claim 9, wherein an inbound network packet received from the cloud provider comprises the cloud provider MAC address, the computing node in the virtualization system translates the cloud provider MAC address in the inbound network packet into the first virtualization system MAC address for the first virtual machine and the second virtualization system MAC address for the second virtual machine.

13. The method of claim 9, wherein an outbound network packet received from the first virtual machine comprises a virtualization system MAC address that is different from the cloud provider MAC address, and the virtualization system translates the virtualization system MAC address in the outbound network packet to the cloud provider MAC address before sending the outbound network packet to the cloud provider that further sends the outbound network packet to a destination.

14. The method of claim 10, further comprising receiving, from the cloud provider, the second cloud provider IP address that is assigned to the second virtual machine on the computing node.

15. The method of claim 9, further comprising maintaining a MAC address translation table that respectively correlates the cloud provider MAC address with the first virtualization system MAC address for the first virtual machine and the second virtualization system MAC address for the second virtual machine and a communication packet from the first or second virtual machines is modified prior to transmission of the communication packet from the computer node and through the cloud provider by:
changing a source mac address of the first or second virtual machine to the cloud provider MAC address and conditionally changing a destination mac address to another shared cloud provider MAC address assigned to another network interface of another computing node in the virtualization system.

16. The method of claim 9, further comprising configuring a virtual local area network (VLAN) to route a network packet comprising at least the cloud provider MAC address to the second virtual machine by using at least a virtualization system MAC address for the second virtual machine and layer 2 switching between network interfaces of the VLAN when both the first and the second virtual machine are identified in network traffic at least by the cloud provider MAC address.

17. A system, comprising:
a non-transitory storage medium having stored thereon a sequence of instructions; and
a processor that executes the sequence of instructions to cause acts comprising, receiving, from a cloud provider that provides computing resources to a tenant, a cloud provider media access control (MAC) address that is assigned to a network interface of a computing node of a virtualization system, wherein the computing node comprises a bare metal computing node of a plurality of bare metal computing nodes that form the virtualization system, and virtual system MAC addresses in the virtualization system are assignable by the tenant; and providing network communication to the computing node through the cloud provider at least by:
configuring, by the tenant, a first virtual machine on the computing node for the network communication by assigning both the cloud provider MAC address and a first virtualization system MAC address; and
configuring, by the tenant, a second virtual machine on the computing node for the network communication by assigning both the cloud provider MAC address and a second virtualization system MAC address, wherein the first and the second virtual machines share the cloud provider MAC address and are assigned to different virtualization system MAC addresses.

18. The system of claim 17, wherein both a first cloud provider Internet Protocol (IP) address and a second cloud provider IP address are associated with the cloud provider MAC address and the first cloud provider IP address is assigned to the first virtual machine and the second cloud provider IP address is assigned to the second virtual machine, where the first and second cloud provider IP addresses are different IP addresses.

19. The system of claim 18, wherein the first and second cloud provider IP addresses are received by operation of an application programming interface (API) to request a pool of IP addresses that correlates to the cloud provider MAC address.

20. The system of claim 17, wherein an inbound network packet received from the cloud provider comprises the cloud provider MAC address, and the virtualization system respectively translates the cloud provider MAC address in the inbound network packet to the first virtualization system MAC address for the first virtual machine or the second virtualization system MAC address for the second virtual machine.

21. The system of claim 17, wherein an outbound network packet received from the first virtual machine comprises a virtualization system MAC address that is different from the cloud provider MAC address, and the virtualization system translates the virtualization system MAC address in the outbound network packet to the cloud provider media access control before sending the outbound network packet to the cloud provider that further sends the outbound network packet to a destination.

22. The system of claim 18, wherein the acts further comprise receiving, from the cloud provider, the second cloud provider IP address that is assigned to the second virtual machine on the computing node.

23. The system of claim 17, wherein the acts further comprise maintaining a MAC address translation table that respectively correlates the cloud provider MAC address with the first virtualization system MAC address for the first virtual machine and the second virtualization system MAC address for the second virtual machine and a communication packet from the first or second virtual machines is modified prior to transmission of the communication packet from the computer node and through the cloud provider by:
changing a source mac address of the first or second virtual machine to the cloud provider MAC address and conditionally changing a destination mac address to another shared cloud provider MAC address assigned to another network interface of another computing node in the virtualization system.

24. The system of claim 17, wherein the acts further comprise routing a network packet comprising at least the cloud provider MAC address to the second virtual machine with at least a virtualization system MAC address for the second virtual machine and further acts of a virtual local area network (VLAN) to perform layer 2 switching between network interfaces of the VLAN when both the first and the second virtual machine are identified at least by the cloud provider MAC address.

* * * * *